United States Patent
Collet et al.

[11] Patent Number: 5,967,588
[45] Date of Patent: Oct. 19, 1999

[54] VISOR CONTROL

[75] Inventors: Corbin L. Collet; Kenneth D. Kreuze; Michael L. Lanser, all of Holland, Mich.

[73] Assignee: Prince Corporation, Holland, Mich.

[21] Appl. No.: 09/099,972

[22] Filed: Jun. 19, 1998

Related U.S. Application Data

[63] Continuation-in-part of application No. 08/835,998, Apr. 11, 1997, Pat. No. 5,820,197.

[51] Int. Cl.$^6$ .......................................................... B60J 3/00
[52] U.S. Cl. ..................................... 296/97.11; 296/97.13; 248/291.1
[58] Field of Search ............................. 296/97.9, 97.11, 296/97.12, 97.13; 248/291.4

[56] References Cited

U.S. PATENT DOCUMENTS

| | | | |
|---|---|---|---|
| 2,628,861 | 2/1953 | Greig | 296/97.12 |
| 3,035,864 | 5/1962 | Davidson | 248/291.1 |
| 4,352,518 | 10/1982 | Prince et al. | 296/97.12 |
| 4,489,974 | 12/1984 | Warhol | 284/291.1 |
| 4,500,131 | 2/1985 | Fleming . | |
| 4,582,356 | 4/1986 | Kaiser et al. | 248/291.1 |
| 4,617,699 | 10/1986 | Nakamura | 296/97.9 |
| 4,702,513 | 10/1987 | Ebert et al. | 296/97.9 |
| 4,828,313 | 5/1989 | Lanser et al. . | |
| 4,902,063 | 2/1990 | Crink . | |
| 4,925,233 | 5/1990 | Clark | 296/97.13 |
| 4,944,549 | 7/1990 | Hilbert et al. | 296/97.9 |
| 5,139,303 | 8/1992 | Miller | 296/97.9 |
| 5,366,265 | 11/1994 | Aymerich et al. . | |
| 5,383,700 | 1/1995 | Argo et al. | 296/97.12 |
| 5,820,197 | 10/1998 | Lanser | 296/97.12 |
| 5,823,603 | 10/1998 | Crotty, III | 296/97.12 |

FOREIGN PATENT DOCUMENTS

| | | | |
|---|---|---|---|
| 467710 | 8/1950 | Canada | 296/97.9 |
| 398400 | 11/1990 | European Pat. Off. | 296/97.12 |
| 3345764 | 6/1985 | Germany | 296/97.12 |

*Primary Examiner*—Joseph D. Pape
*Assistant Examiner*—Kiran Patel
*Attorney, Agent, or Firm*—Harness, Dickey & Pierce P.L.C.

[57] ABSTRACT

A vehicle visor having a pivot rod or a slip tube with a torque control disposed therein. The pivot rod or slip tube surface is provided with a layer of hardened material on the external surface to improve the wear and abrasion resistance of the pivot rod or slip tube surface in contact with the torque control. A preferred embodiment for the hardened material layer is a hard coat anodized surface layer on an aluminum pivot rod or slip tube.

21 Claims, 3 Drawing Sheets

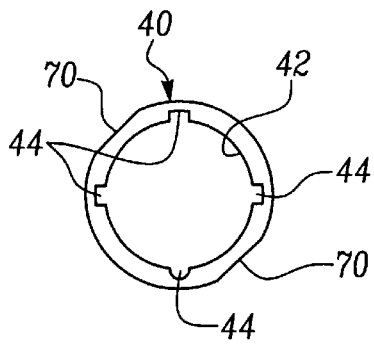
_Fig-6_
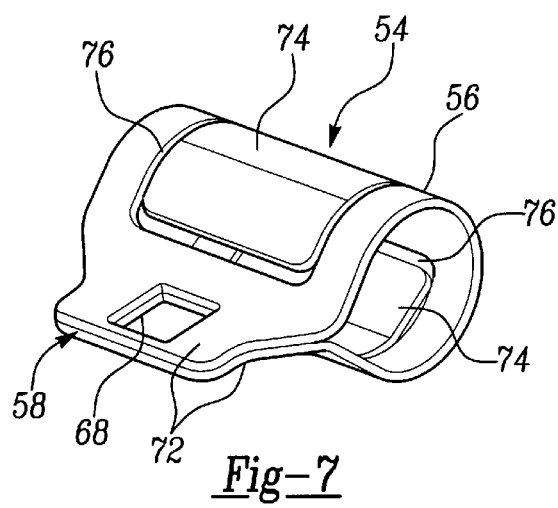
_Fig-7_
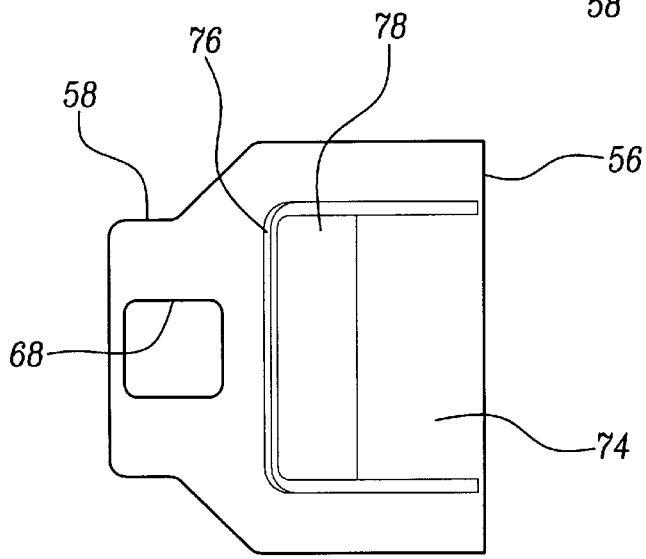
_Fig-8_
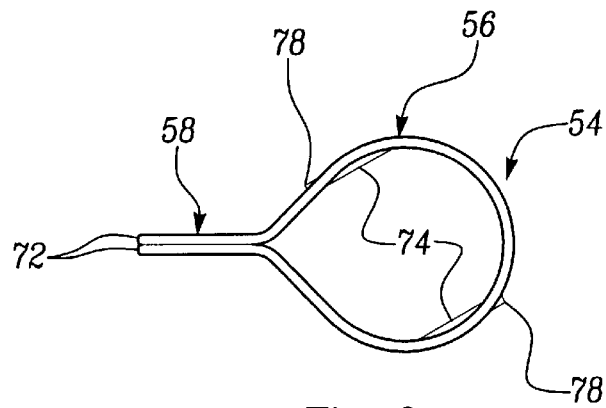
_Fig-9_

VISOR CONTROL

CROSS REFERENCE TO RELATED APPLICATION

This application is a continuation-in-part of U.S. patent application Ser. No. 08/835,998, filed Apr. 11, 1997, now U.S. Pat. No. 5,820,197.

BACKGROUND OF THE INVENTION

The present invention relates to a visor torque control.

There exist numerous visor torque controls which are designed to allow a visor to pivot from a stored position adjacent a vehicle headliner to selected lowered use positions. The design of such torque controls require that the visor be relatively easily lowered to selected use positions and yet maintain their adjusted position during movement of the vehicle. Some torque controls for visors also provide detent positions for locking the visor in a raised stored position and/or a primary lowered use position. An example of one such torque control which has been in widespread commercial use is represented by U.S. Pat. No. 4,500,131.

Visors frequently include a variety of accessories, such as illuminated vanity mirrors, and in recent years, trainable garage door opening transmitters, cellular telephones and the like. Such accessories integrated into visor bodies add to the weight of the visor making the torque control more difficult to design and successfully hold a visor in a desired adjusted position and yet allow ease of use.

Wraparound torque controls have been proposed for relatively simple visor designs in which the entire length of a visor surrounds a fixed rod as disclosed, for example, in U.S. Pat. No. 1,862,432. Such construction, although functional for the early vintage vehicle visors described therein, is not applicable to modem visor construction. Also, proposals have suggested using a wraparound-type torque control in connection with a polymeric sleeve between the control and the visor rod. French Patent No. 2 407 836 suggests such a structure. One difficulty with a relatively thick polymeric sleeve, however, is that, with use of heavier accessory-laden visors, the sleeve material tends to deform or "creep", thus, loosening the interface between the visor and the pivot rod. Further, the sleeve adds an element of additional cost to the torque control.

There exists a need, therefore, for a visor torque control which is relatively inexpensive and yet meets the design criteria necessary for modem visor designs. Further, with the increasing sensitivity of the cost of vehicle components by manufacturers, it is desirable to have a visor torque control which is relatively inexpensive and requires less tooling and material costs.

SUMMARY OF THE PRESENT INVENTION

The torque control of the present invention solves the need for a torque control which is capable of satisfying the design criteria of modem vehicle visors. It accomplishes this goal by providing a visor torque control made of spring steel formed to circumscribe at least a substantial proportion of a visor pivot rod. The pivot rod has a layer of hardened material forming an external surface of the pivot rod to improve the wear and abrasion resistance of the pivot rod. The visor body, which is fixedly attached to the torque control, can rotate about the pivot rod with relative ease and yet be held in a secure, adjusted position. In a preferred embodiment, the pivot rod is made of aluminum and the layer of hardened material is created through an electro-chemical process which results in a hard coat anodized surface layer on the aluminum pivot rod.

In an alternative embodiment, the torque control can also include a polymeric coating on the surface which engages the pivot rod. The polymeric material provides the desired frictional characteristics and operational feel to the rotation of the visor about the pivot rod.

In another embodiment, an intermediate tube is disposed upon the pivot rod and the torque control is disposed upon the intermediate tube. Such a structure has the advantage that the pivot rod can be made of a variety of materials while the intermediate tube is made of aluminum that is hard coat anodized to provide the layer of hardened material on the surface of the intermediate tube. In addition, the intermediate tube can be slidably mounted to the pivot rod such that the visor body can be longitudinally moved along a length of the pivot rod. This enables the visor to be adjustable over a broader range of positions when positioned along the side of the seat occupant. The sliding visor can be moved fore and aft along the side window to a position where it blocks the sun.

Further objects, features and advantages of the invention will become apparent from a consideration of the following description and the appended claims when taken in connection with the accompanying drawings.

BRIEF DESCRIPTION OF THE DRAWINGS

FIG. 6 is an end view of the intermediate tube;

FIG. 7 is a perspective view of the torque control in the visor shown in FIG. 4;

FIG. 8 is a plan view of the torque control of FIG. 7; and

FIG. 9 is an end view of the torque control shown in FIG. 7.

DETAILED DESCRIPTION OF THE PREFERRED EMBODIMENT

Figure 1:
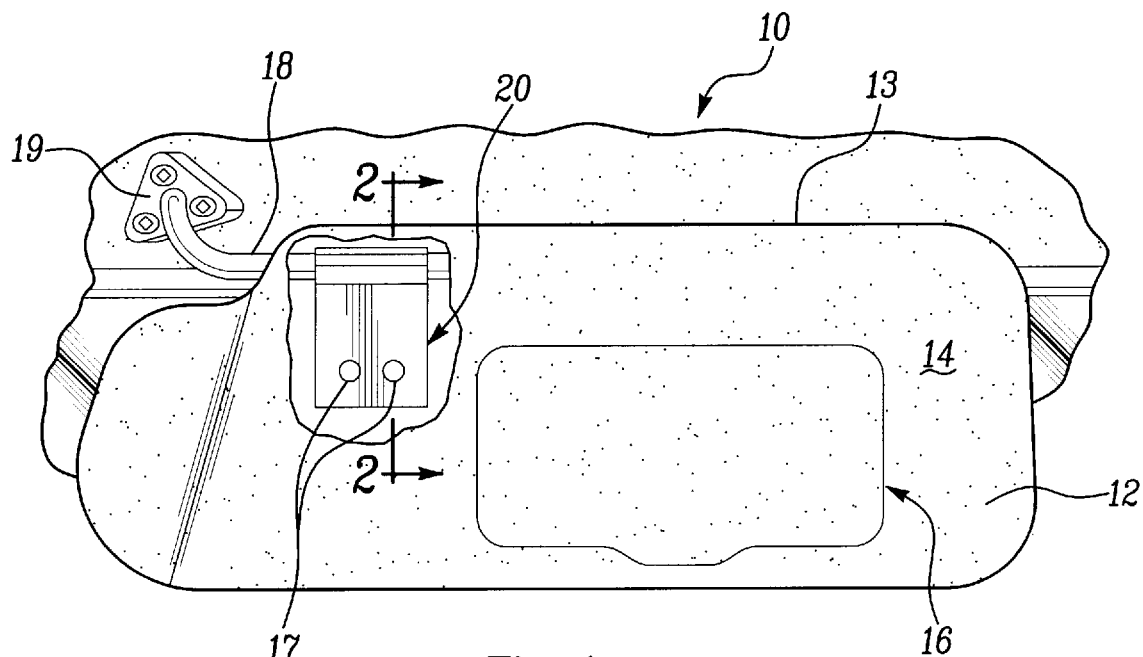
FIG. 1 is a front elevational view of a visor, partly broken away, showing the torque control of the present invention.

With reference to FIG. 1, a visor 10 for a vehicle, such as an automobile is shown. The visor includes a visor body 12 typically having a butterfly core construction with two panels folded over at the top edge 13 of the visor. The body 12 forms a hollow, light-weight and yet strong visor body covered with a suitable upholstery fabric 14 conforming the visor 10 to the interior decor of the vehicle into which it is installed. The visor 10 may optionally include an illuminated vanity mirror assembly 16 as is known for vehicle visors.

A visor core construction which can accommodate the torque control 20 of the present invention is disclosed in U.S. Pat. No. 5,007,532, the disclosure of which is incorporated herein by reference. Torque control 20 is mounted over a generally cylindrical pivot rod 18 which extends within the visor body 12 and includes an elbow terminating in a mounting bracket 19 of conventional construction for securing the visor 10 to the headliner or roof of a vehicle body. The torque control 20 is fixedly mounted to the visor body 12 by, in one embodiment, fastening means such as rivets 17 extending through the front wall 15 of the visor body 12 to secure the torque control 20 to the visor body 12. In the event a polymeric core is employed, the apertures 24 of the torque control 20 receive fused polymeric material for their retention of the torque control 20.

The torque control 20 allows the visor to rotate about the longitudinal axis of the pivot rod 18 and hold the visor 10 in the selected lowered use position illustrated in FIG. 1, or in a raised position against the vehicle headliner when not in use. The pivot rod 18 can be hollow to accommodate the electrical supply conductors 31 (shown in FIG. 6) for the covered illuminated vanity mirror assembly 16.

Figures 2, 3:
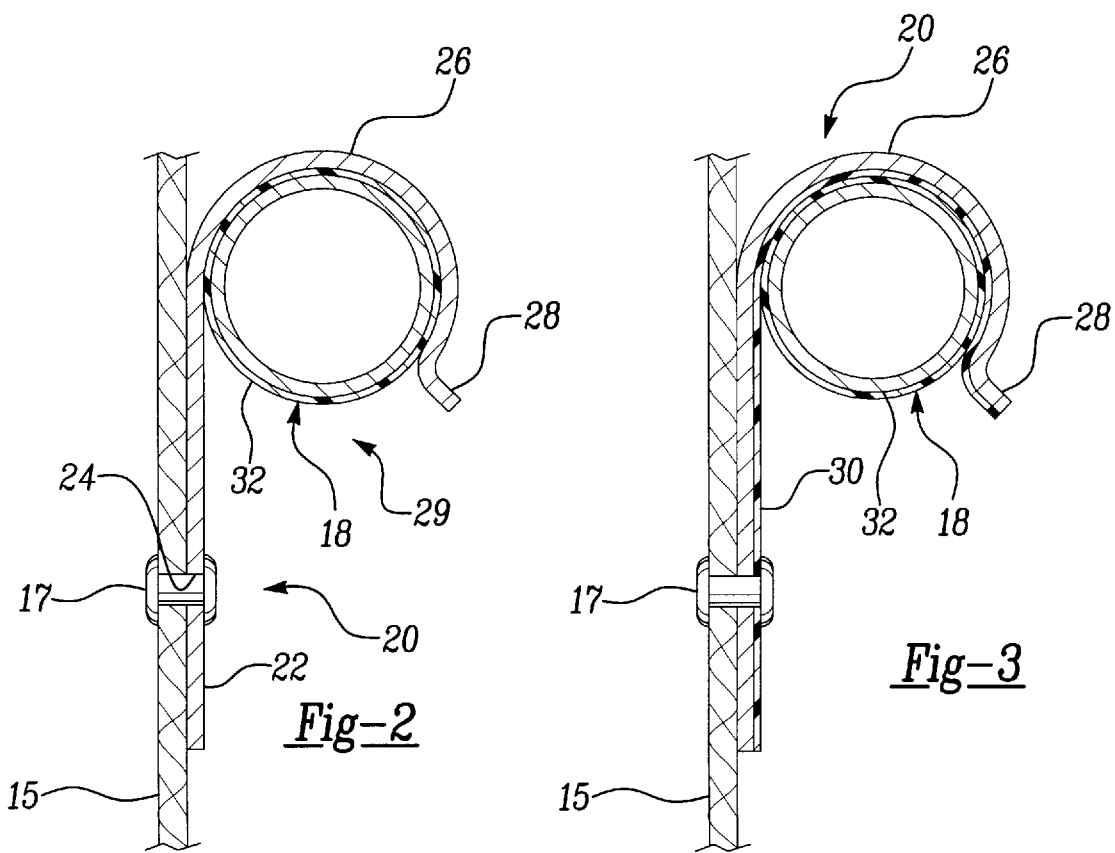
FIG. 2 is an enlarged vertical sectional view of the torque control and the pivot rod taken along the line 2—2 of FIG. 1.
FIG. 3 is an enlarged vertical cross-sectional view of an alternative embodiment of the torque control and visor rod taken along the section line 2—2 of FIG. 1.

The torque control 20 is formed of a generally rectangular spring steel member made of prehardened 0.040 gauge steel having a downwardly projecting flange 22 with apertures 24 for attaching the torque control 20 to one half of the visor body 12 as illustrated in FIG. 2. Torque control 20 is formed to include a collar 26, which at least partially circumscribes the pivot rod 18 as seen in FIG. 2. In the preferred embodiment, the collar 26 extends approximately 270° around the pivot rod 18. The spring steel torque control 20 integrally includes, at an end of the collar 26 remote from the flange 22, an outwardly projecting tang 28 which defines, in conjunction with flange 22, an opening slot 29 for snap-fitting the torque control 20 over the pivot rod 18 during assembly.

A layer 32 of hardened material forms the exterior surface of the pivot rod. The hardened material layer 32 provides a smooth finish to the pivot rod 18 and also provides wear and abrasion resistance to the pivot rod 18 surface. In a preferred embodiment, the hardened material layer 32 is a hard coat anodized material layer. Such a surface can provide excellent wear and abrasion resistance. In addition, consistent friction properties are also provided. Other surface hardening processes can be used if desired.

The interior surface of the torque control 20 facing the rod 18, when assembled, can be coated with a polymeric material 30 as shown in FIG. 3. The polymeric material coating 30 is provided at least in the collar area 26 although preferably, the entire interior surface of the torque control 20 is coated. The coating material can be an epoxy-based material or a polyester having from about 15–20% and preferably 17% of PTFE (Teflon®) compounded with the base polymeric material. The thickness of the coating 30 in the preferred embodiment is from about 0.0005 to about 0.001 inch thick with the torque control 20 being precoated prior to its forming.

The tang 28 of the torque control 20 can be compressed toward the flange 22 to increase the compression of the torque control 20 around the pivot rod 18 as desired for the level of torque required for a given visor 10.

Figure 4:
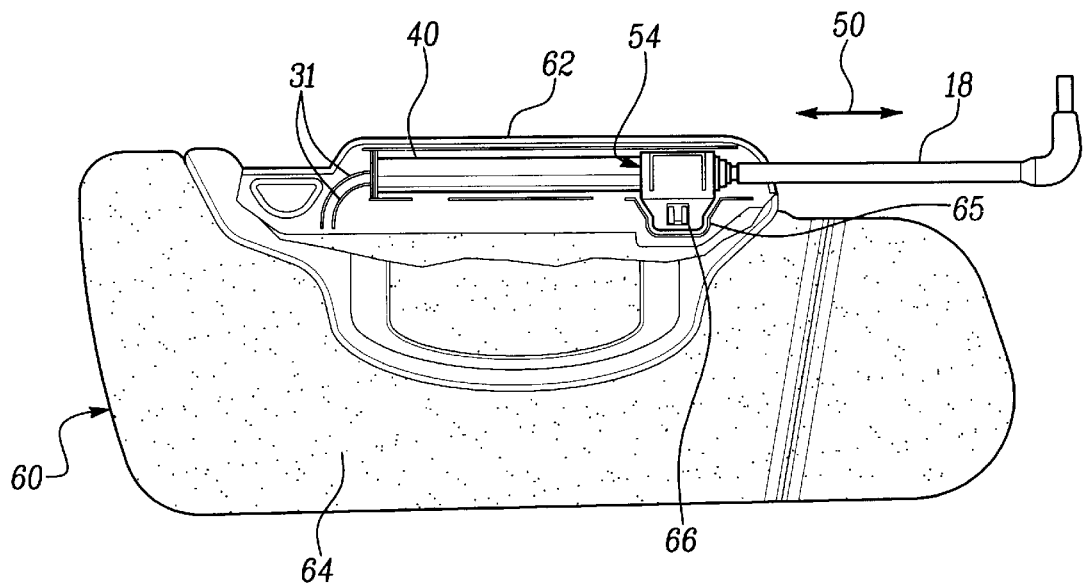
FIG. 4 is a front elevational view of a visor showing an alternative embodiment of the torque control of the present invention.
Figure 5:
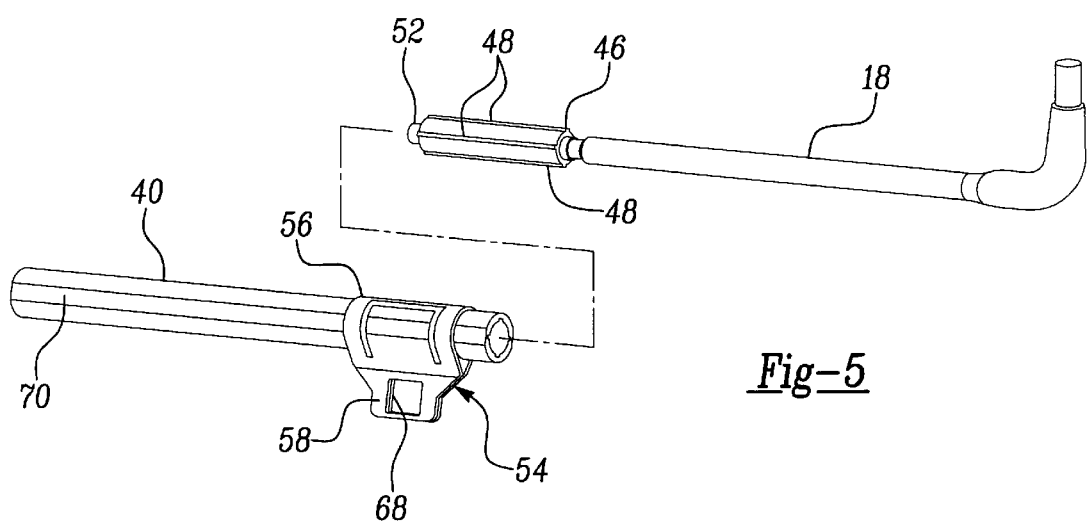
FIG. 5 is an exploded perspective view of the pivot rod, the intermediate tube, and torque control of the alternative embodiment shown in FIG. 4.

In another embodiment of the invention, an intermediate tube 40 is disposed over the end of the pivot rod 18. The intermediate tube 40, also known as a slip tube, is shown in greater detail in FIGS. 5 and 6. The slip tube 40 has an inner surface 42 which is splined with a plurality of grooves 44. The slip tube 40 is able to telescopically engage over the end of pivot rod 18, an end portion 46 of which is provided with a splined outer surface. The splined outer surface forms ribs 48 which are received in the grooves 44 in the inner surface of the slip tube 40. The splined grooves 44 and the ribs 48 prevent rotation of the slip tube 40 relative to the pivot rod 18. The slip tube 40, however, is able to slide longitudinally along the axis of the pivot rod 18. This enables the visor body 12 to be moved longitudinally relative to the pivot rod 18 as shown by the double arrow 50 in FIG. 4. The end portion 46 of the pivot rod 18 is preferably formed by an injection molded plastic body molded onto the core 52 of the pivot rod 18 to form the ribs 48. The lower groove 44 in the slip tube 40, as shown in FIG. 6, has a different profile from the other three grooves 44. Likewise, one of the ribs 48 has a different profile than the others to receive the lower groove 44. This enables the rotational position of the slip tube 40 relative to the pivot rod 18 to be fixed.

A torque control 54 is disposed on the slip tube 40 and includes a generally cylindrical collar 56 and an extending flange 58. The visor body 60 includes two injection molded plastic bracket halves 62, also know as a back bone, which sandwich an upholstered visor core 64 therebetween. Also sandwiched between the bracket halves 62 are the pivot rod 18, the slip tube 40 and the torque control 54. The bracket halves 62 include inwardly raised walls 65 forming a pocket to receive the flange 58 of the torque control 54. In addition, raised plastic tabs 66 extend through the aperture 68 in the torque control flange 58. The walls 65 and the tabs 66 ensure that the torque control 54 will rotate about the slip tube 40 together with the visor body 60 when the visor body 60 is rotated.

The slip tube 40 can have a cylindrical exterior surface whereby the torque control 54 holds the visor 10 in position solely by frictional forces between the torque control 54 and the slip tube 40. In a preferred embodiment, the slip tube 40 is formed with two longitudinally extending flat surfaces 70 which function with the torque control 54 to provide a detent to hold the visor in a selected position, such as the raised stored position, in a manner more fully described below. In a preferred embodiment, the slip tube 40 is an aluminum extrusion which is economical to produce. The layer 32 of hardened material on the slip tube 40 is formed by hard coat anodizing the aluminum slip tube. A conventional hard coat anodizing process is used such as the anodizing process used with aluminum engine blocks. Other hard surface coatings can be used on the slip tube or torque control if desired.

With reference to FIGS. 7, 8, and 9, the torque control 54 is described in greater detail. The torque control 54 is formed from a generally rectangular spring steel member to integrally include the generally cylindrical collar 56 in the center portion. The two end portions 72 of the steel member are joined together, such as by spot-welding, to form the flange 58 which extends generally radially outward from the collar 56.

The collar 56 is formed with a pair of spring or detent fingers 74. The spring fingers 74 are formed in the collar 56 by a generally U-shaped cut outs 76 forming the fingers having a distal end portions 78 which can flex radially relative to the generally cylindrical collar 56. The distal end portions 78 of the spring fingers 74 are flat to engage the flat surfaces 70 of the slip tube 40 in surface-to-surface contact. The flat distal end portions 78 of the spring fingers 74 and the flat surfaces 70 of the slip tube 40 create a detent to provide greater retention forces to hold the visor 10 in the position where the spring finger flat end portions 78 engage the flat surfaces 70 of the slip tube 40 in surface-to-surface contact. This position is typically the raised stored position of the visor, against the vehicle headliner. To move the visor 10 from this position, the spring fingers 74 must deflect radially outward to move out of surface-to-surface contact with the slip tube 40 flat surfaces 70. This requires slightly greater torque to initially move the visor 10 from the stored position. In addition, as the visor 10 is returned to the stored position, the spring fingers 74 tend to "snap" the visor 10 into the stored position. This creates a detent for holding the visor 10 in the stored position. It is understood that the flat surfaces 70 of the slip tube 40 can be provided at other locations to create a detent at visor positions other than the stored position if desired.

The high friction forces caused by the spring fingers 74 sliding over the flat surfaces 70 of the slip tube 40 create the need for a high wear and abrasion resistance of the slip tube 40 surface. It is for this reason that the aluminum slip tube 40 is provided with the layer 32 of hardened material. While the layer 32 is most beneficial with the aluminum tube and the torque control 54 with the detent spring fingers, the layer 32 may be beneficial with non-detent type torque control devices as well.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

We claim:

1. A visor comprising:
    an elongated generally cylindrical member having a longitudinal axis;
    a visor body mechanically communicating with said cylindrical member and rotatable about said axis of said cylindrical member;
    a torque control mounted to said cylindrical member, said torque control having a collar at least partially circumscribing said cylindrical member and having a mounting flange extending from said collar for coupling said torque control to said visor body to allow rotation of said torque control with said visor body about said cylindrical member; and
    a layer of hardened material forming an external surface on at least a portion of said cylindrical member in contact with said collar of said torque control.

2. The visor as defined in claim 1 wherein said cylindrical member is made of aluminum.

3. The visor as defined in claim 1 wherein said layer of hardened material is a hard coat anodized material layer.

4. The visor as defined in claim 1 wherein said cylindrical member is a visor pivot rod having one end adapted to be attached to a vehicle.

5. The visor as defined in claim 1 further comprising a polymeric coating integrally formed on an interior surface of said collar for interfacing with said cylindrical member.

6. The visor as defined in claim 5 wherein said polymeric coating comprises an epoxy-based material with a PTFE filler.

7. The visor as defined in claim 6 wherein said polymeric coating comprises an epoxy-based material of from about 80–85% and 15–20% of PTFE.

8. The visor as defined in claim 1 wherein said cylindrical member has at least one longitudinally extending flat surface portion and said torque control includes a radially flexible spring finger with a flat distal end portion, said flat distal end portion of said spring finger being operable to engage said flat surface portion of said cylindrical member in surface-to-surface contact at a predetermined rotational position to thereby form a detent to hold said visor body at said predetermined position.

9. The visor as defined in claim 1 further comprising a pivot rod having a longitudinally extending portion concentric with said axis of said cylindrical member and wherein said cylindrical member is able to telescopically engage said longitudinally extending portion of said pivot rod.

10. The visor as defined in claim 9 wherein said cylindrical member is made of aluminum.

11. The visor as defined in claim 10 wherein said layer of hardened material is a hard coat anodized material layer on said aluminum cylindrical member.

12. A visor comprising:
    a visor pivot rod having one end adapted to be attached to a vehicle body and having an elongated distal end portion with a longitudinal axis;
    an elongated generally cylindrical tube telescopically engaging said end portion of said pivot rod and being non-rotatably coupled to said pivot rod;
    a visor body mechanically communicating with said cylindrical tube for rotation about said axis of said pivot rod;
    a torque control mounted to said cylindrical tube, said torque control having a collar at least partially circumscribing said cylindrical tube and having a mounting flange extending from said collar for coupling said torque control to said visor body to allow rotation of said torque control with said visor body about said cylindrical tube; and
    a layer of hardened material forming an external surface on at least a portion of said cylindrical tube in contact with said torque control.

13. The visor as defined in claim 12 wherein said cylindrical tube is made of aluminum.

14. The visor as defined in claim 12 wherein said layer of hardened material is a hard coat anodized material.

15. The visor as defined in claim 12 wherein said cylindrical tube is longitudinally movable on said pivot arm whereby said visor body can be moved longitudinally relative to said pivot rod.

16. The visor as defined in claim 12 wherein said cylindrical tube has at least one longitudinally extending flat surface portion and said torque control includes a radially flexible spring finger with a flat distal end portion, said flat distal end portion of said spring finger being operable to engage said flat surface portion of said tube in surface-to-surface contact at a predetermined rotational position to thereby form a detent to hold said visor body at said predetermined position.

17. A visor comprising:
    an elongated cylinder having an external surface with at least one generally flat longitudinally extending surface, said elongated cylinder having a layer of hardened material forming said external surface;
    a visor body operable to rotate with respect to the elongated cylinder, said visor body mechanically communicating with said elongated cylinder;
    a torque control mechanically communicating with both said elongated cylinder and said visor body, said torque control including a generally cylindrical collar; and
    at least one spring finger disposed on said generally cylindrical collar of said torque control, said spring finger being operable to flex radially with respect to said generally cylindrical collar and being able to engage said flat longitudinally extending surface on said elongated cylinder so as form a detent with said elongated cylinder;
    whereby wear between said torque control and said elongated cylinder during rotation of said visor body is reduced.

18. The visor as defined in claim 17 wherein the elongated cylinder has two generally flat longitudinally extending surfaces and said torque control has two spring fingers disposed on said generally cylindrical collar of said torque control, said spring fingers being operable to flex radially with respect to said generally cylindrical collar and being able to engage said two flat longitudinally extending surfaces of said elongated cylinder.

19. The visor as defined in claim 17 wherein said spring finger has a flat distal end portion operable to engage said flat longitudinally extending surface of said cylinder in surface-to-surface contact.

20. The visor as defined in claim 17 wherein said elongated cylinder is an aluminum cylinder.

21. The visor as defined in claim 17 wherein the layer of hardened material is a hard coat anodized layer on the external surface of said elongated cylinder.

\* \* \* \* \*

UNITED STATES PATENT AND TRADEMARK OFFICE
CERTIFICATE OF CORRECTION

PATENT NO : 5,967,588
DATED : October 19, 1999
INVENTOR(S): Corbin L. Collet; Kenneth D. Kreuze; Michael L. Lanser.

It is certified that error appears in the above-identified patent and that said Letters Patent is hereby corrected as shown below:

In Column 1, Line 57, "modem" should read --modern--

Signed and Sealed this

Twelfth Day of September, 2000

Attest:

Q. TODD DICKINSON

Attesting Officer    Director of Patents and Trademarks